United States Patent [19]

Miller

[11] Patent Number: 5,092,634
[45] Date of Patent: Mar. 3, 1992

[54] SEALED TUBE BLOCK ASSEMBLY

[75] Inventor: William P. Miller, Willowick, Ohio

[73] Assignee: Parker Hannifin Corporation, Cleveland, Ohio

[21] Appl. No.: 610,608

[22] Filed: Nov. 8, 1990

[51] Int. Cl.$^5$ ............................................. F16L 41/08
[52] U.S. Cl. .................... 285/222; 285/328; 285/382.4; 285/382.5; 29/523
[58] Field of Search .................. 285/222, 382.4, 382.5, 285/328; 29/523

[56] References Cited

U.S. PATENT DOCUMENTS

| | | | |
|---|---|---|---|
| 2,165,621 | 7/1939 | Donahue et al. | 285/222 X |
| 2,438,529 | 3/1948 | Woodling | 285/382.5 X |
| 3,778,090 | 12/1973 | Tobin | 285/222 |
| 3,787,945 | 1/1974 | Posek et al. | 285/222 X |
| 3,924,883 | 12/1975 | Frank | 285/382.5 X |
| 4,142,843 | 3/1979 | Kish | 285/382.5 X |

Primary Examiner—Dave W. Arola
Attorney, Agent, or Firm—Christopher H. Morgan

[57] ABSTRACT

A sealed tube block assembly and method of making the same includes a tube block having two opposing walls with an axial bore therethrough. The bore is defined by first and second counterbores respectively in the walls and a reduced diameter serrated bore connecting the counterbores. The serrated bore is axially spaced from one of the counterbores by an axially tapered bore. The tapered bore has a maximum diameter less than the diameter of the adjacent counterbore but greater than the diameter of the serrated bore. An elastomeric seal is positioned in the tapered bore and a washer is positioned in the adjacent counterbore. The tube is formed with a first integral bead that seats in the opposite counterbore, and a second bead that seats in the counterbore which retains the washer and seal. The tube portion that contacts the washer and seal is finished as by swaging to provide an improved seal surface. The washer, tapered bore and tube form a controlled groove that insures correct compression of the seal after the second tube bead is formed.

12 Claims, 1 Drawing Sheet

U.S. Patent
Mar. 3, 1992
5,092,634
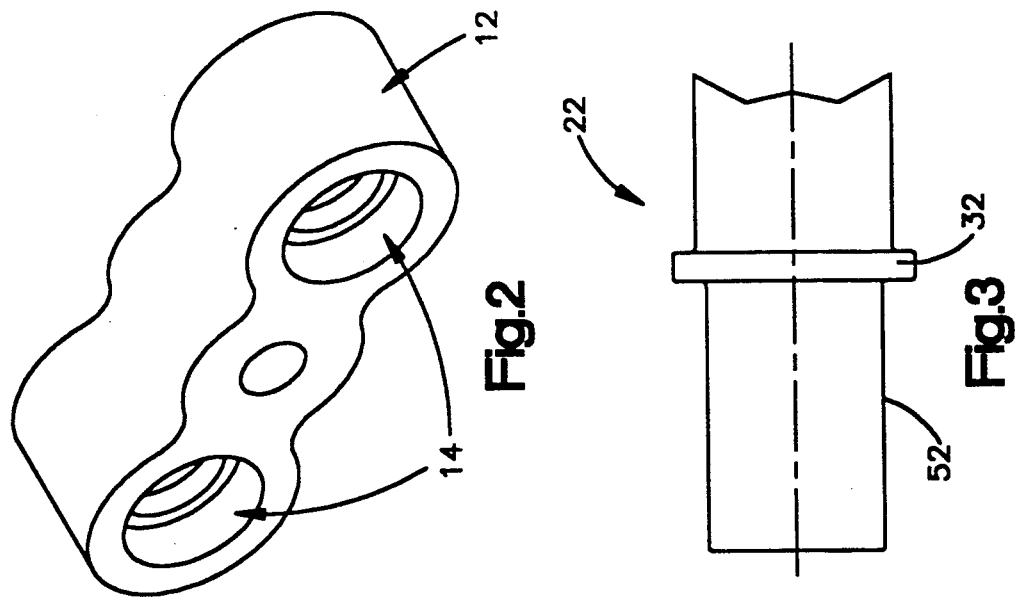
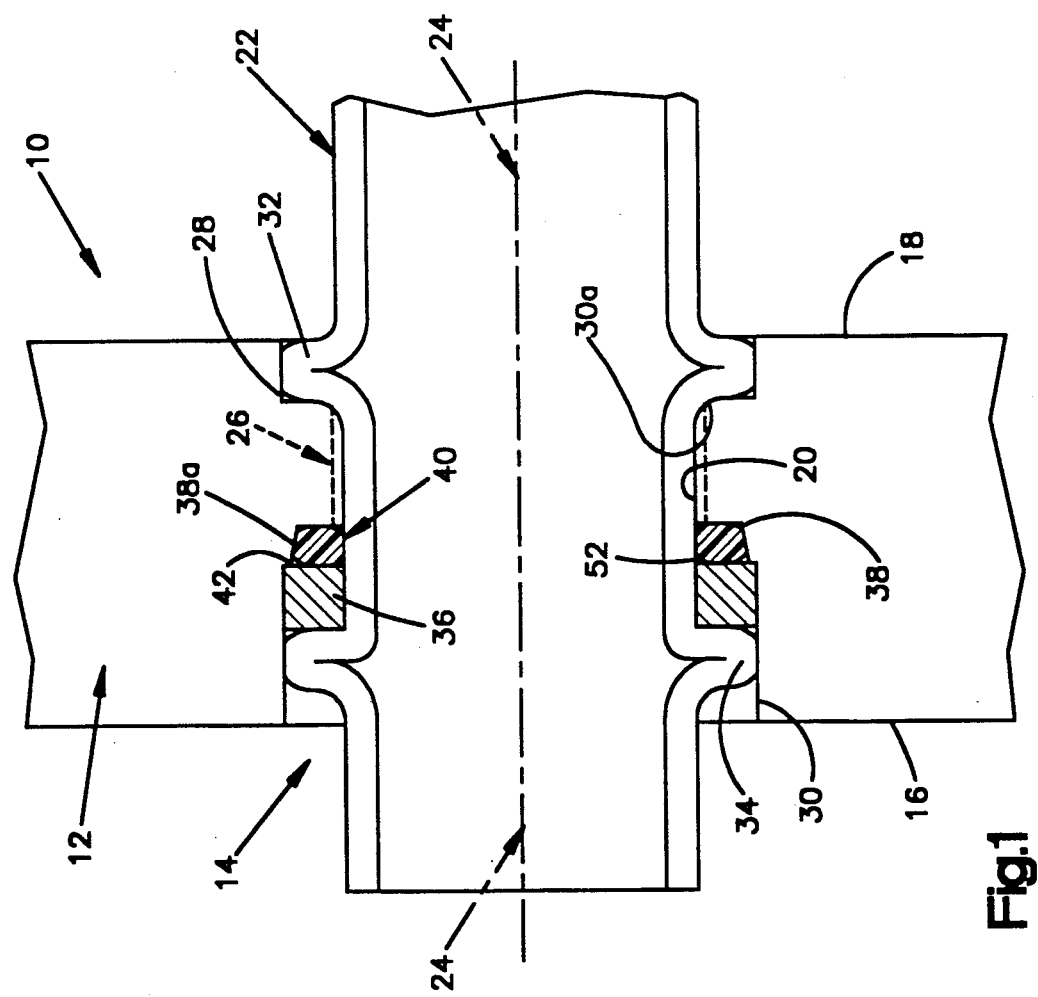

SEALED TUBE BLOCK ASSEMBLY

BACKGROUND OF THE INVENTION

The present invention generally relates to fluidtight connections between tubes, pipes and the like and various tube assembly blocks such as manifolds. More specifically, the invention relates to fluidtight beaded connections between tube blocks and relatively thin-walled tubing.

Prior efforts at forming a fluidtight beaded tube connection typically have used an o-ring compressed by the tube bead against a tube block wall or counterbore. Such a design is disclosed in U.S. Pat. No. 3,778,090 issued to Tobin. However, there are numerous problems associated with this technique. Among them is the fact that the bead itself is used as one of the sealing surfaces, but unfinished tubing does not provide a good sealing interface even with an o-ring type seal. The contour and configuration of the bumped bead is difficult to control for repeatability and predictability. Also, since the bump is formed in direct contact with the o-ring there is a substantial risk of pinching or cutting the o-ring, or failing to properly compress the o-ring due to a misformed bead. The inner surface of a counterbore is also typically scratched by the machining process. All of these conditions contribute to an unreliable seal against fluid leakage caused by poor o-ring-/surface contact or incorrect compression of the o-ring seal.

SUMMARY OF THE INVENTION

The present invention overcomes the above-described problems of the prior art by providing an assembly that has a predetermined and repeatable seal between the tube and the tube block, and the method for making the same.

The present invention contemplates a sealed tube assembly for tube and tube block wherein the tube block has a controlled groove that provides a predetermined compression on an elastomeric sealing device. According to this aspect of the invention, the controlled groove is formed by a washer, a bore, and the outer surface of the tube. The washer is disposed between a tube bead surface and the elastomeric sealing device, thus providing improved surface contact with the seal.

The present invention further contemplates a sealed tube assembly in which a portion of the tube in contact with the sealing device is finished so as to also provide an improved sealing surface. According to this aspect of the invention, the improved tube surface is formed by a swaging operation that reduces the tube diameter.

According to another aspect of the invention, the controlled groove bore used to retain the sealing element is axially tapered to minimize surface irregularities caused by the machining process. Yet another aspect of the invention is the use of moldable plastic material for the tube block which can significantly reduce the cost of the block. The design and process for providing a rigid fluidtight seal in accordance with the invention permits the tube block to be made of such plastics and similar materials, as well as metals such as aluminum.

These and other aspects and advantages of the present invention will be appreciated by those skilled in the art from the following detailed specification in view of the accompanying drawings.

BRIEF DESCRIPTION OF THE DRAWINGS

FIG. 1 is a longitudinal cross-section of a sealed tube block assembly acccording to the present invention;

FIG. 2 is a perspective of a tube manifold block that may be used with the invention; and FIG. 3 is a tube prepared for installation in a tube block according to the present invention.

DESCRIPTION OF PREFERRED EMBODIMENTS

Referring to FIG. 1, a sealed tube and tube block assembly according to the present invention is generally indicated by the numeral 10. Such an assembly includes a tube block 12 to which tubes, pipes, or similar pieces of fluid handling material are to be attached in a fluidtight manner. The term "tube block" is intended to be a general reference to any tube connection or mounting block such as, for example, a manifold block that requires one or more tubes to be attached thereto. According to the present invention, the tube block 12 may be made from a metal material such as aluminum, in which case the various bores and grooves are machined; or the block may be made from plastic material such as phenolic, in which case the tube block can be formed in a mold; or the block may be made from die cast metal or powdered metal. As shown in FIG. 2, the tube block may have a plurality of orifices 14 for attaching tubing or pipes. In actual use, the present invention has been used on a tube manifold block for an air conditioning system that requires a dual tube connection for the inflow and outflow of compressor fluid.

Each orifice 14 in the tube block 12 is a generally cylindrical bore formed in the following manner. The tube block has two opposite walls 16, 18. A through bore 20 is machined with a diameter correctly sized to slightly less than the outside diameter of the tube 22. The through bore 20 lies along a longitudinal central axis 24. The through bore 20 is preferably serrated along a portion 26 (represented by dashed lines in FIG. 1) that directly contact the tube 22 outer surface. The serrations help hold the tube in place and in particular prevent twisting or tube rotation within the block 12. The serrations may be formed by a separate step such as broaching.

A first counterbore 28 is formed in one wall 18 and a second counterbore 30 is formed in the other wall 16. The depth of the first counterbore 28 is selected to receive a first bead 32 formed in the tube 22 so that a generally flush appearance results with the bead 32 substantially recessed in the block 12.

The second counterbore 30 is coaxial with the first counterbore 28 and through bore 20. The second counterbore 30 is also formed axially deeper than the first counterbore 28 to accommodate a second bead 34 on the tube 22 and a washer 36. The first counterbore 30 is preferably formed with a radius 30a to reduce stress on the tube after the second bead 34 is formed. Again, preferably the second bead 34 is substantially recessed in the respective counterbore 30.

Another coaxial bore 38 is formed that is axially adjacent the second counterbore 30. This intermediate bore 38 is formed with an axial taper 38a to minimize scratches and other surface irregularities during the manufacturing process. The tapered bore 38 is sized to have a maximum diameter that is less than the diameter of the second counterbore 30, and a minimum diameter that is greater than the diameter of the through bore 20.

An elastomeric sealing device 40, such as, for example, a conventional o-ring, is placed in the tapered bore 38. As shown in FIG. 1, when the tube 22 and washer 36 are positioned in the block 12, they coact to form a groove 42 which retains the seal 40. This groove is controlled dimensionally so that proper compression is always applied to the seal relatively independently of the bead 34 forming process on the tube 22. The washer 36 is selected to have a good smooth sealing surface in contact with the seal 40.

With reference to FIG. 3, the tube 22 is first preferably provided with an integral external bead 32. This bead 32 can be formed in a conventional manner such as by bumping the tube on an arbor with a die. Alternatively a bead could be separately attached by brazing or similar technique, but the use of an integral bead is preferred to minimize cost and manufacturing steps.

A portion 52 of tube 22 that inserts into the block 12 is next swaged down to a diameter that allows the tube to be inserted in the through bore 20. Reducing the diameter of the tube 22 can be done with any conventional swaging or similar process that serves to smooth over the outer surface of the tube 22. Swaging is preferred as it is a common technique that involves minimal cost. By so preparing the tube 22 outer surface, a good sealing surface contacts the elastomeric seal 40 when the assembly 10 is put together.

The formed tube 22 is then inserted into the block 12 until the first bead 32 bottoms in the first counterbore 28. The tube 22 can be installed in the block 12 either before or after the elastomeric seal 40 and washer 36 are installed. Finally, a second bead 34 is formed on the tube 22 so as to seat the washer 36 in the second counterbore 30. Again, the second bead 34 is formed by a conventional bumping technique well known to those skilled in the art.

The controlled groove 42 formed by the washer 36, tube portion 52 and tapered bore 38 insures proper compression of the seal 40 even if the tube beads are misformed. The washer 36 also provides a better more uniform sealing surface than would the internal face of the second bead 34. The controlled groove 42 also minimizes the risk of a pinched seal 40. The double beads rigidly lock the tube in the tube block in a fluidtight manner. With the beads 32, 34 recessed in the block 12, the block can easily be mounted on another assembly and has a uniform appearance. The present invention, by providing a rigid connection and controlled fluidtight seal, also permits plastics such as 400° F. (minimum) phenolic and similar materials to be used for the tube block 12.

While the invention has been shown and described with respect to a particular embodiment thereof, this is for the purpose of illustration rather than limitation, and other variations and modifications of the specific embodiments herein shown and described will be apparent to those skilled in the art within the intended spirit and scope of the claimed invention.

What is claimed is:

1. A rigid sealed tube block assembly comprising a tube block having two walls and a cylindrical bore extending along an axis between said walls, said bore being defined by a first and second respective counterbore in each wall and a reduced diameter portion between said counterbores, said reduced diameter portion being axially spaced from the second counterbore by an intermediate bore, said intermediate bore being axially adjacent said second counterbore and having a diameter greater than said reduced diameter portion and less than the second counterbore diameter thereby forming a shoulder between said second counterbore and said intermediate bore; a tube in the tube block cylindrical bore, a washer in the second counterbore abutting said shoulder such that said washer, tube and intermediate bore form a controlled groove, and an elastomeric seal compressed in said groove into sealing engagement with said intermediate bore and said tube, said tube having a first external bead abutting said washer in the second counterbore, and a second external bead in the other counterbore.

2. A sealed tube block assembly according to claim 1 wherein said intermediate bore is an axially tapered bore.

3. A sealed tube block assembly according to claim 2 wherein said tapered bore has a finished substantially serrated surface.

4. A sealed tube block assembly according to claim 2 wherein said tube has a swaged reduced diameter portion in contact with said washer and elastomeric seal.

5. A sealed tube block assembly according to claim 4 wherein said tube block is made of a molded plastic material.

6. A sealed tube block assembly according to claim 4 wherein said tube first and second beads are integral parts of the tube.

7. A sealed tube block assembly according to claim 6 wherein said first counterbore is formed with a radius at the intersection of said first counterbore and said reduced diameter portion and being adjacent said first external tube bead.

8. A method for rigidly connecting a tube and tube block in a fluidtight manner comprising the steps of:
   a) forming counterbores in opposite walls of the tube block;
   b) forming a tapered bore axially adjacent one of the counterbores with a reduced diameter relative to the counterbore;
   c) forming a cylindrical bore with a reduced diameter relative to said tapered bore connecting said tapered bore and the other counterbore;
   d) placing an elastomeric seal in the tapered bore;
   e) placing a washer in said one counterbore adjacent the tapered bore;
   f) forming a first external bead on a tube that fits in the other counterbore;
   g) forming a portion of the tube to a reduced diameter;
   h) inserting the tube into the tube portion block until said first bead seats in the other counterbore; and
   i) forming a second external bead on the tube within the first counterbore to compress the elastomeric seal into sealing engagement with said tapered bore and said tube.

9. A method for rigidly connecting a tube and tube block in a fluidtight manner according to claim 8 wherein the step of forming a portion of the tube to a reduced diameter is by swaging.

10. A method for rigidly connecting a tube and tube block in a fluidtight manner according to claim 8 wherein the step of forming the external tube beads is performed by bumping the tube.

11. A method for rigidly connecting a tube and tube block in a fluidtight manner according to claim 9 wherein the step of forming said one counterbore further includes the step of forming a radius on said one counterbore at the intersection of said one couterbore and said cylindrical bore and being adjacent said second external tube bead.

12. A method for rigidly connecting a tube and tube block in a fluidtight manner according to claim 8 wherein steps a, b and c are performed by a molding process using plastic material.